United States Patent
Figari

(10) Patent No.: US 8,683,735 B1
(45) Date of Patent: Apr. 1, 2014

(54) HORIZONTALLY OPPOSED UNIVERSAL OUTRIGGER ASSEMBLY

(71) Applicant: Figari Enterprise Inc., Jensen Beach, FL (US)

(72) Inventor: Gerard G. Figari, Jensen Beach, FL (US)

(73) Assignee: Figari Enterprise Inc., Jensen Beach, FL (US)

( * ) Notice: Subject to any disclaimer, the term of this patent is extended or adjusted under 35 U.S.C. 154(b) by 0 days.

(21) Appl. No.: 13/779,817

(22) Filed: Feb. 28, 2013

(51) Int. Cl.
- A01K 87/06 (2006.01)
- A01K 91/053 (2006.01)
- A01K 87/02 (2006.01)

(52) U.S. Cl.
USPC ............. 43/27.4; 43/21; 43/26.1; 43/18.1 CT

(58) Field of Classification Search
USPC .............................. 43/21, 26.1, 27.4, 18.1 CT
See application file for complete search history.

(56) References Cited

U.S. PATENT DOCUMENTS

| | | | |
|---|---|---|---|
| 2,291,380 A | 7/1942 | Dibert | |
| 2,719,688 A | 10/1955 | Seifert | |
| 3,193,964 A | 7/1965 | Hurst | |
| 3,968,587 A | 7/1976 | Kammeraad | |
| 4,334,380 A * | 6/1982 | Daniels | 43/27.4 |
| 4,388,774 A | 6/1983 | Thoemke | |
| 4,610,409 A | 9/1986 | Emory, Jr. | |
| 4,869,195 A | 9/1989 | Eichfeld | |
| 4,901,469 A | 2/1990 | Murray | |
| 5,301,541 A | 4/1994 | Joseph | |
| 5,361,528 A | 11/1994 | Peacock | |
| 5,445,102 A | 8/1995 | Rupp | |
| 5,921,196 A | 7/1999 | Slatter | |
| 6,557,481 B1 | 5/2003 | Schweid | |
| 7,111,574 B2 * | 9/2006 | Slatter | 114/255 |
| 7,640,692 B1 | 1/2010 | Baynard | |
| 8,347,546 B2 * | 1/2013 | Rupp | 43/27.4 |
| 2003/0167674 A1 * | 9/2003 | Cooper | 43/27.4 |
| 2005/0126063 A1 | 6/2005 | Bowerman | |
| 2006/0191185 A1 * | 8/2006 | Hansen | 43/27.4 |
| 2007/0084104 A1 * | 4/2007 | Demetris | 43/18.1 CT |
| 2008/0000144 A1 * | 1/2008 | Mark | 43/42.72 |
| 2011/0083356 A1 | 4/2011 | Rupp | |
| 2011/0083357 A1 * | 4/2011 | Blondek et al. | 43/27.4 |

* cited by examiner

*Primary Examiner* — Kimberly Berona
*Assistant Examiner* — Michael Wang
(74) *Attorney, Agent, or Firm* — Ferris H. Lander, Inc.

(57) ABSTRACT

The presently disclosed technology is directed to an outrigger assembly for a sport fishing boat. The outrigger assembly is provided with a base plate that mounts on the forward area of a T-top of the fishing boat. An outrigger pole containment assembly is in turn mechanically affixed to the base plate. A pair of telescoping outrigger poles is positioned within the outrigger pole containment assembly such that they are in a horizontally opposed configuration. Each pole is formed from a plurality of elongated tubular extensions, in a nested relationship, and is extensible outward to either the starboard or port side of the boat when being deployed. The outrigger assembly is provided with a plurality of manual or electrically operated reels for traversal of several fishing lines through line guiding means provided integral with the telescoping poles.

26 Claims, 9 Drawing Sheets

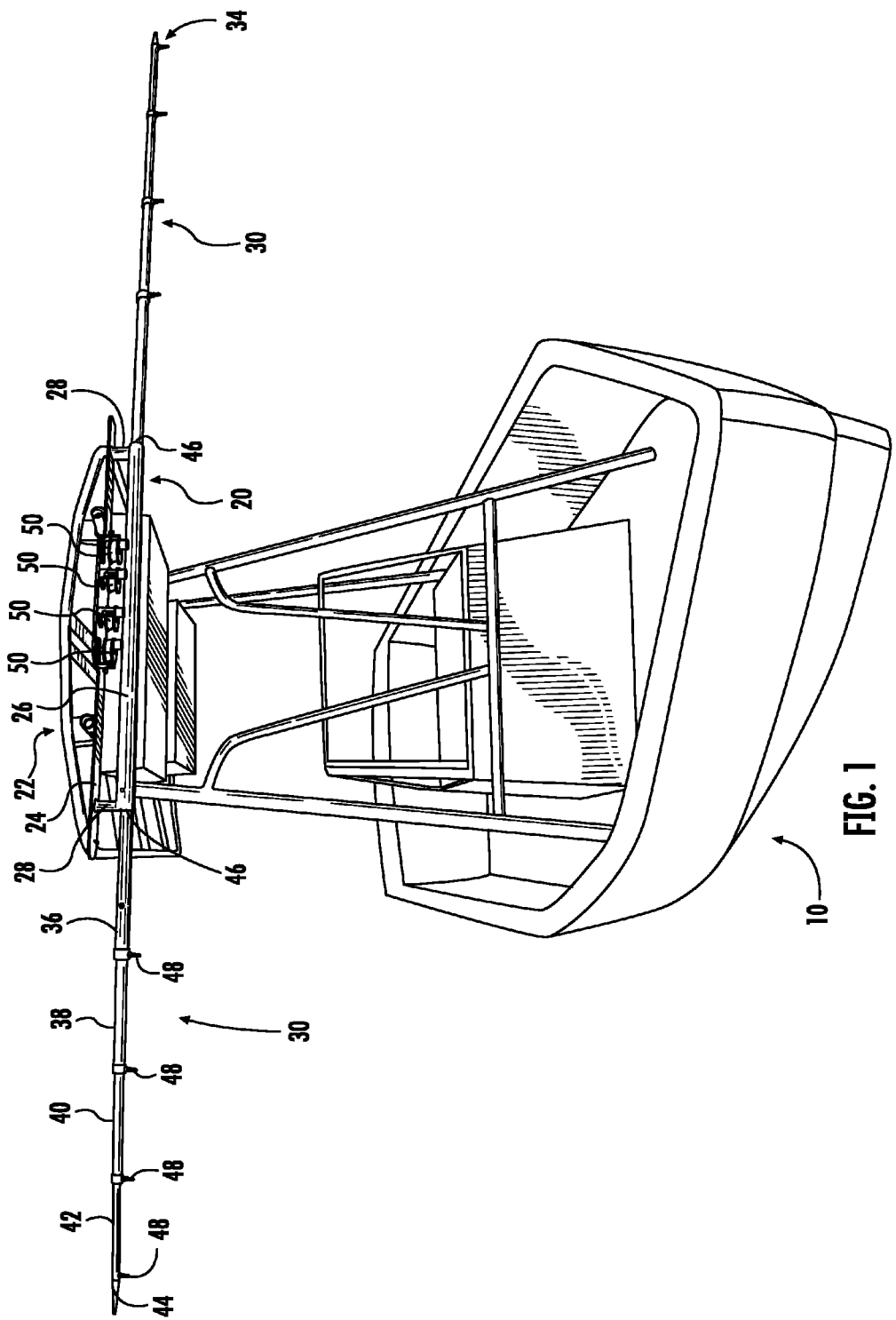

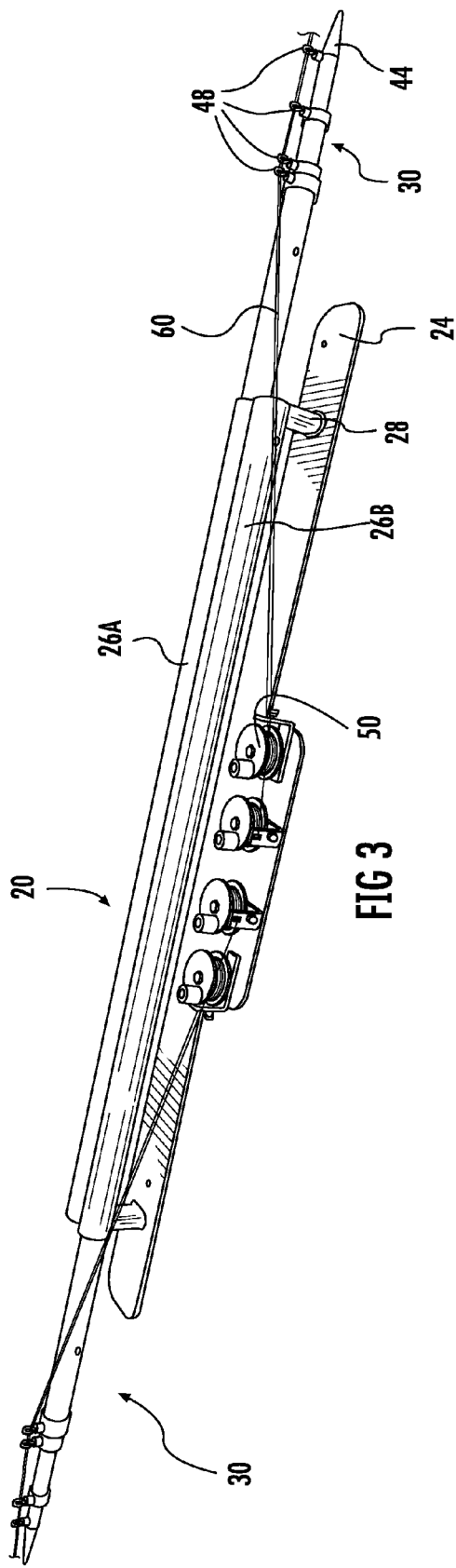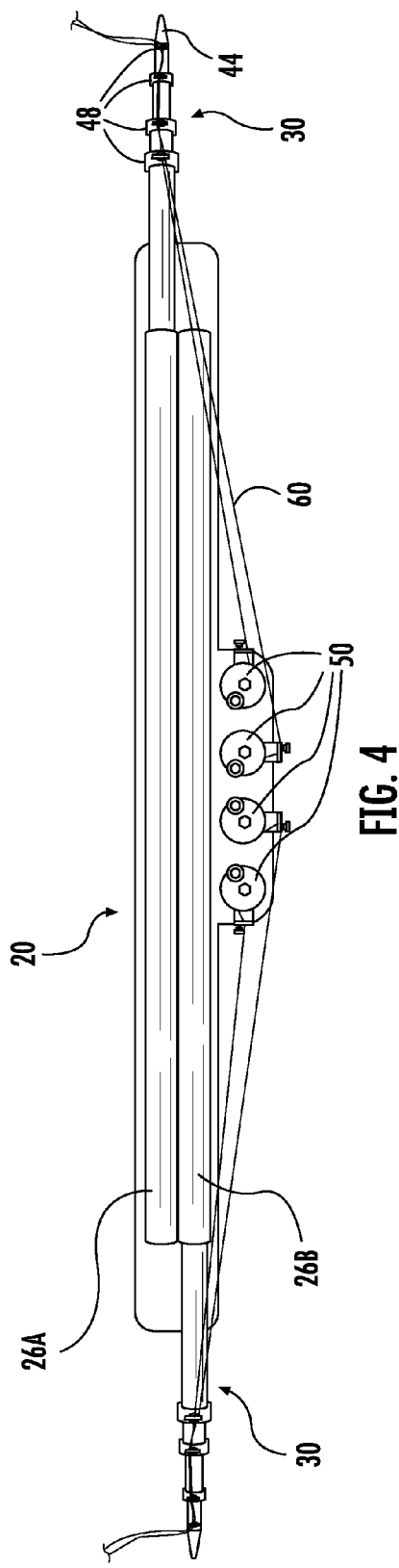

HORIZONTALLY OPPOSED UNIVERSAL OUTRIGGER ASSEMBLY

FIELD OF THE INVENTION

This invention relates to sport fishing boat outriggers, particularly to a horizontally opposed outrigger assembly, and most particularly to an outrigger assembly useful for teasers.

BACKGROUND OF THE INVENTION

Outriggers are useful when trolling for surface fish. Outriggers are generally deployed on sport fishing boats where they assist in covering a larger fishing area, enabling the use of a plurality of lines, and thereby improving the chances for making a catch.

Outriggers are most commonly seen on offshore and Great Lakes fishing boats. Generally, outrigger assemblies are formed from fixed or telescoping poles, which are swung outward at a wide angle (generally 90°) from the boat. The use of outriggers allow for a spread of multiple lines adjusted behind the boat to avoid tangling. Outriggers are generally mounted on the side or top of a cabin or T-Top, on radar arches, or on the gunwale.

In some instances, the outrigger assemblies are stored vertically, and released when it is desired to lower them to an effective trolling position. An alternative design mounts the outriggers above the T-top. A handle, which may extend below the T-top, is turned from within the cabin or below the T-top in order to swing the outriggers outward and away from the boat to their deployed trolling position. The storage and running position of T-top outriggers is a straight-back position, which facilitates passing under low bridges, trailering, and the like.

It is common to use outriggers to troll both hooked baits and "teaser" baits. Teasers are generally set out to draw fish up close to the surface, at which point the fish can be coaxed to take one of the several hooked baits in the spread behind the teasers. When teasers are deployed from the same outriggers as the rest of the spread, it can often be difficult to retract the teasers while fish are hitting the hooked baits. Another problem is getting the teasers out of the way when it becomes necessary to fight a fish while walking around the boat or back and forth through the cockpit.

In an embodiment, the present invention provides an outrigger assembly where the telescoping outrigger poles reside in an assembly that positions them in a horizontally opposed configuration. In an embodiment, the assembly is positioned below the T-top of a boat, forward of the helm area, where the captain of the vessel can easily deploy and retract the teaser rigs while the remainder of the crew is free to fight the fish in the cockpit area. In such an embodiment the telescoping poles may be easily retracted to conform to the width of the boat for docking and to navigate in narrow channels to avoid any collisions.

DESCRIPTION OF THE PRIOR ART

U.S. Pat. No. 3,193,964 is directed toward an outrigger fishing line guide, which is attached to a halyard deployed upon a pole extending outwardly from a vessel. The bait may be extended inward or outward from the boat by pulling the halyard through sheaves attached to the pole.

U.S. Pat. No. 4,388,774 discloses a fishing system for a recreational, commercial or pleasure type boat (B) which includes an inner pair of fishing poles (10) mounted near the gunwales (GW) of boat (B) to position inner fishing lines (12) closely adjacent the sides of boat (B). A rearwardly extending pair of fishing poles (14) are carried by holders (16) mounted on the stern of boat (B) to position lines (18) laterally inwardly of lines (12). An outer pair of fishing poles (20) are mounted on the outward end portions of elongate booms (38) to position outer lines (24) at a location a relatively large distance laterally outwardly from lines (12). Booms (38) are disposed transversely to the length of boat (B) and are supported by antifriction support assemblies (40) which support booms (38) for extensional travel outwardly from one side of boat (B) and for retractional travel towards the opposite side of boat (B).

U.S. Pat. No. 4,869,195 discloses a pair of aligned elongate members for extension transversely across and mounting on a boat, a connection between the inner ends of the elongate members, locating pins on the elongate members for engagement in the rod holders of a boat, and fishing pole receivers on the elongate members and connector, for trolling bait and lures behind a boat.

U.S. Pat. No. 4,901,469 is directed towards an expansible device attachable to the stern of a boat for mounting fishing rigs such as downriggers thereon. The device includes a framework which extends horizontally across the stern of the boat, with a pair of expansible members disposed near the outboard edges of the framework. The expansible members include extensions telescopically received in the framework which move from a retracted position to an extended, outboard position by means of linear actuators to provide an extended mounting area.

The references fail to teach or disclose an outrigger assembly, mountable on the forward portion of a boat's T-top, wherein the assembly has a pair of telescopingly extensible outrigger poles, each pole having a proximal end and a distal end, and arranged such that each telescoping pole is substantially fully stored within an outrigger containment assembly when in the retracted or storage position, and where each telescoping pole is configured to be extensible in a horizontally opposed direction opposite to the other during deployment.

SUMMARY OF THE INVENTION

The presently disclosed technology is directed to an outrigger assembly for a sport fishing boat, which is easily deployable by a person operating the boat, and is readily adaptable for use with teaser rigs. The outrigger assembly is provided with a base plate that mounts on the T-top of the fishing boat. An outrigger pole containment assembly is in turn mechanically affixed to the base plate. A pair of telescoping outrigger poles is positioned within the outrigger pole containment assembly such that they are in a horizontally opposed configuration. Each pole is formed from a plurality of elongated tubular extensions, in a nested relationship, and is extensible outward to either the starboard or port side of the boat when being deployed. The outrigger assembly is provided with a plurality of manual or electrically operated reels for traversal of several fishing lines through line guiding means provided integral with the telescoping poles.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 1 is a perspective view of a boat illustrating the installed outrigger assembly in a deployed configuration;

FIG. 3 is a perspective view of one embodiment of an outrigger assembly in a substantially retracted configuration;

FIG. 4 is a top plan view of one embodiment of an outrigger assembly in a substantially retracted configuration;

DETAILED DESCRIPTION OF THE INVENTION

Figure 2A:
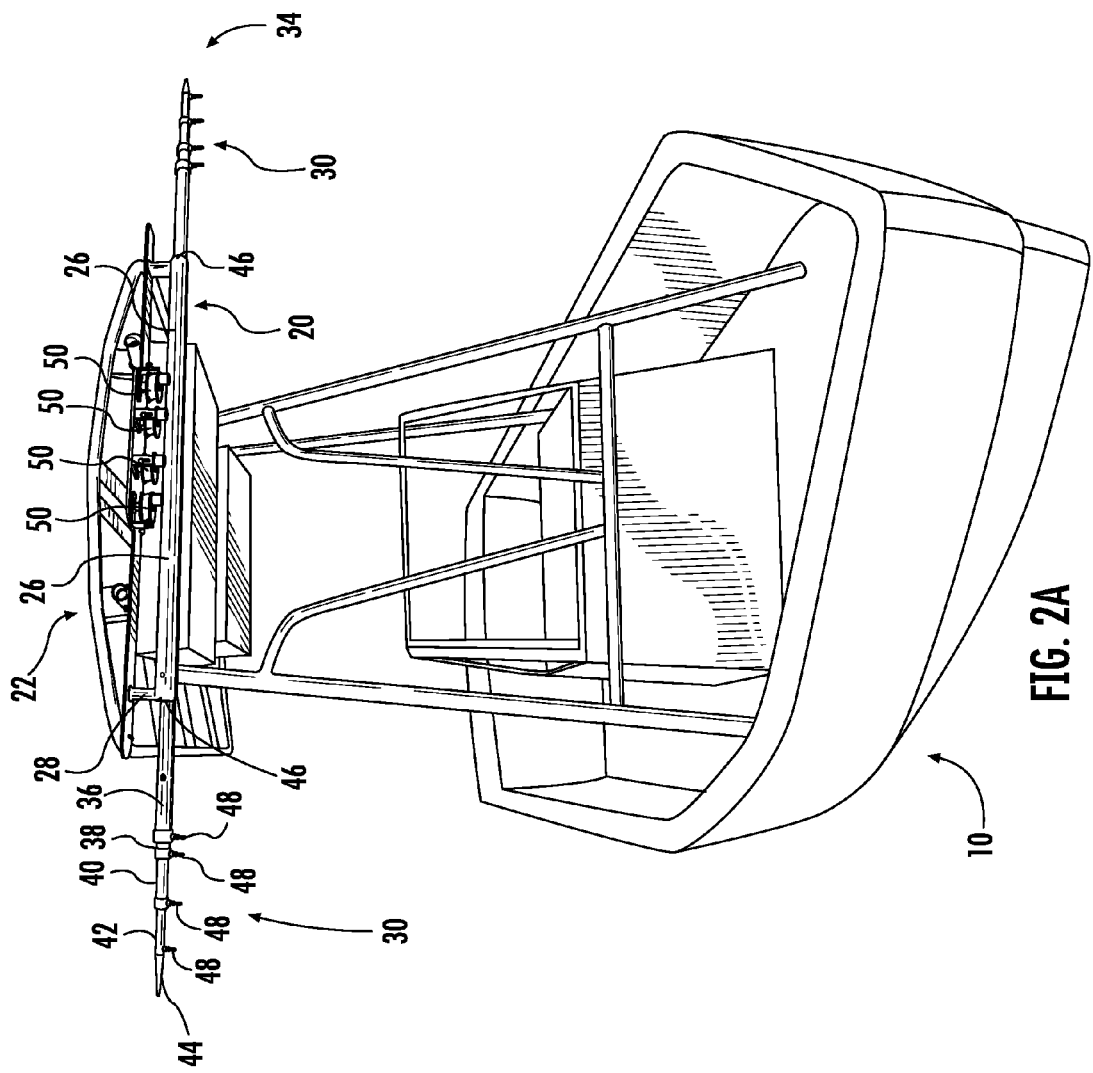
FIG. 2A is a perspective view of a boat illustrating the installed outrigger assembly in a substantially retracted configuration.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art Like numbers refer to like elements throughout.

Referring now to FIG. 1, a perspective view is shown illustrating the installed outrigger assembly of the present invention in a deployed configuration. More particularly, sport fishing boat 10, is illustrated as having an outrigger assembly, generally referred to as element 20, mounted to a T-top 22. The outrigger assembly 20 includes a base plate 24, and a telescoping outrigger pole containment assembly 26 in mechanical engagement with said base plate 24. Dependent upon whether the containment assembly 26 is configured for a pair of telescoping outrigger poles 30 which are parallel to one another (as more clearly illustrated in FIGS. 3 and 4) or are in coaxial relationship (as more clearly illustrated in FIG. 8) containment assembly 26 may be a single tubular element, or a pair of tubular elements, designated 26A and 26B. For simplicity, the containment assembly is generally referred to as element 26, unless illustrated in greater detail, as in FIGS. 3,4 and 8. As illustrated, the mechanical engagement is accomplished using a pair of short tubular sleeves to house elements 28, which may be attached to said base plate 24 and said outrigger pole containment assembly 26 by any conventional means such as welding, riveting, use of a variety of fastener elements, e.g. screws, or the like. The means for mechanical engagement is not critical to the invention, so long as the function of the respective elements 24 and 26 are preserved. The outrigger assembly 20 is further characterized by a pair of telescoping outrigger poles 30, each of said poles having a proximal end 32 (seen in FIG. 6) and a distal end 34, each of said poles being formed from a plurality of elongated, hollow tubular sections 36,38,40,42 of successively smaller cross-section, each said poles being telescopingly joined and movable between a retracted position (see FIG. 2A which illustrates the outrigger poles in a substantially retracted position) and an extended position as shown herein. It is noted that the telescoping outrigger poles 30 are illustrated as containing four sections, but are in no way limited by such illustration. The outrigger poles 30 may contain more or less tubular sections than herein illustrated. The telescoping outrigger pole containment assembly 26 is adapted for reception of the proximal end 32 (as particularly shown in FIG. 6) of each of said telescoping outrigger poles therein. Insertion of the proximal ends 32, of each of said telescoping outrigger poles 30 within opposite side openings 46 of the outrigger containment assembly 26 positions the telescoping outrigger poles distal ends so that they are arranged to extend in opposite and horizontally opposed directions from one another.

In an embodiment the material of construction is anodized aluminum, a material particularly suited for meeting the harsh demands of a saltwater environment. Other alternative useful materials are stainless steel, brass, copper, molded plastics, fiberglass and graphite fiber reinforced materials.

As illustrated in FIG. 1, the telescoping outrigger poles 30 extend in a horizontally opposed fashion when extended from their retracted positions within the containment assembly 26. In an embodiment, the outermost tubular section 42 has a lower open end (not shown) and an end cap 44 affixed to the outermost end thereof. This end cap serves an aesthetic purpose, as well as functioning to keep any matter from entering the hollow tubular sections. The telescoping outrigger poles 30 have means 48 affixed to each tubular section for guiding a fishing or teaser line (not shown). In one illustrative, albeit non-limiting embodiment, the means 48 for guiding a fishing or teaser line is an eyebolt. The outrigger assembly 20 further includes a plurality of reels 50, in mechanical engagement with the base plate 24, each said reels 50 controlling a line adapted to traverse said means 48 for guiding said fishing or teaser line.

With reference to FIG. 2A, a similar perspective view is illustrated, albeit with the outrigger poles 26 in a substantially retracted position.

Figure 2B:
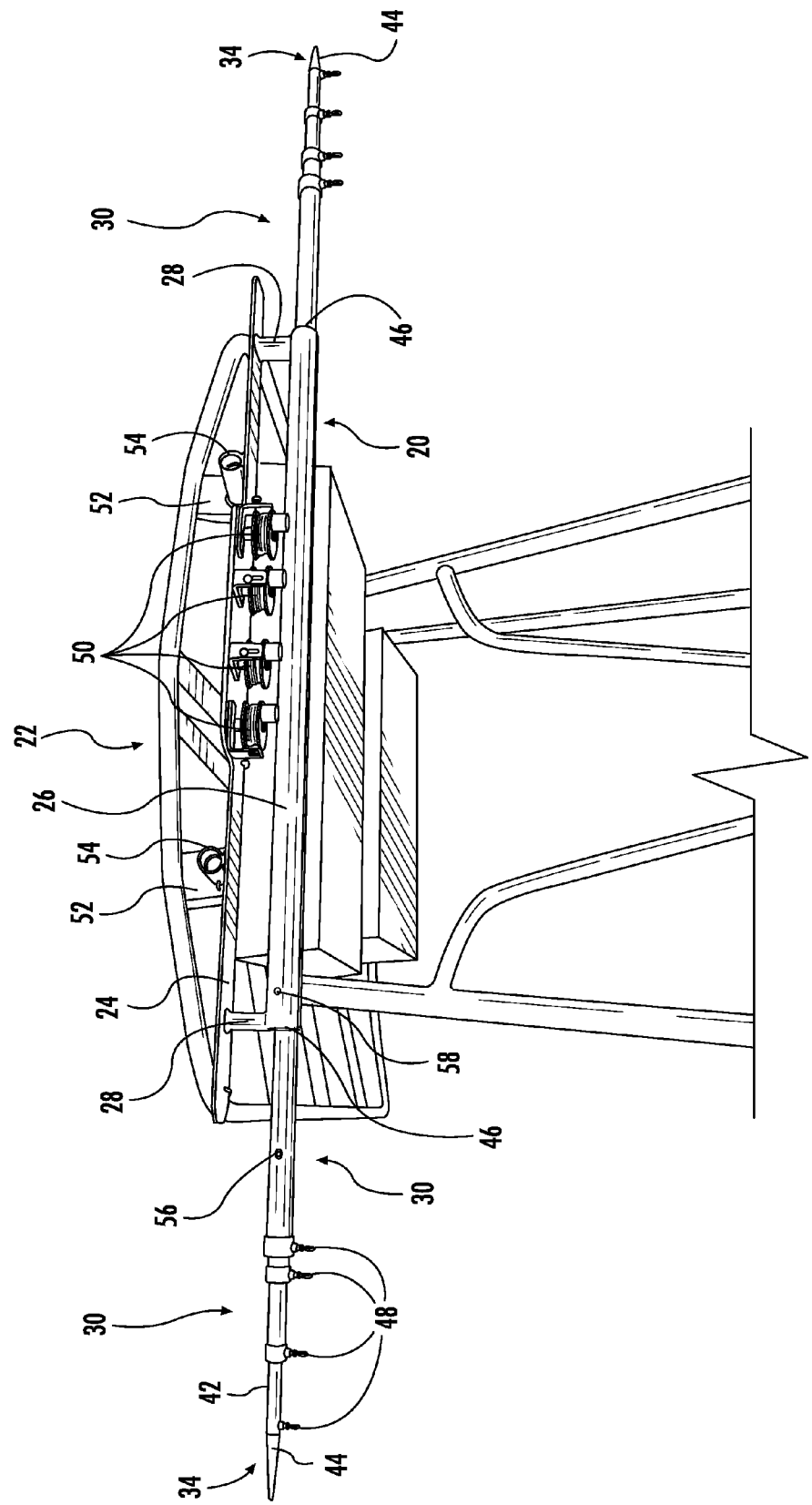
FIG. 2B is a close-up perspective view of the installed outrigger assembly of FIG. 2A.

Referring to FIG. 2B, a close-up perspective view of the outrigger assembly of FIG. 2A is illustrated. Further illustrated herein are locking means whereby said plurality of elongated tubular sections are provided with the ability to be locked to one another. In an illustrative, albeit non-limiting embodiment, the locking means include at least one locking button 56 attached to one of said plurality of elongated tubular sections adapted to be receivably engaged within at least one aperture 58 in an adjacent section. The locking button/aperture combination may include any metallic or non-metallic biased tab or the like having a raised button associated therewith which is urged into the aperture 58 to provide secure engagement. Alternatively any equivalent fastener such as a cotter pin, spring biased retention clip, bayonet type locking element, or the like device suitable for securing one section to another is contemplated by the present invention.

Further illustrated are means for fastening said outrigger assembly 20 to said T-top 22 of said boat 10. In one embodiment the fastening means include at least one mounting element 52 and at least one coupling element 54, constructed and arranged for secure nesting engagement there between. In practice a locking pin (not shown) is configured to secure the mounting element 52 to the coupling element 54.

Now referring to FIGS. 3 and 4, which each respectively shows a perspective and bottom plan view of one embodiment of an outrigger assembly in a substantially retracted configuration. In this embodiment the containment assembly 26 is illustrated as being formed of two parallel tubular elements (26A/26B) a perspective view of an alternative embodiment of an outrigger assembly in a substantially retracted configuration each having a telescoping outrigger pole 30 inserted into a side opening 46 (particularly shown in FIGS. 2A and 2B), whereby the outrigger poles are positioned for horizontally opposed extension from their retracted position. When fully retracted, the ends of the telescoping poles 30 will be essentially flush with the sides of the boat. In these figures fishing line 60 is illustrated traversing through guide elements 48.

Figure 5:
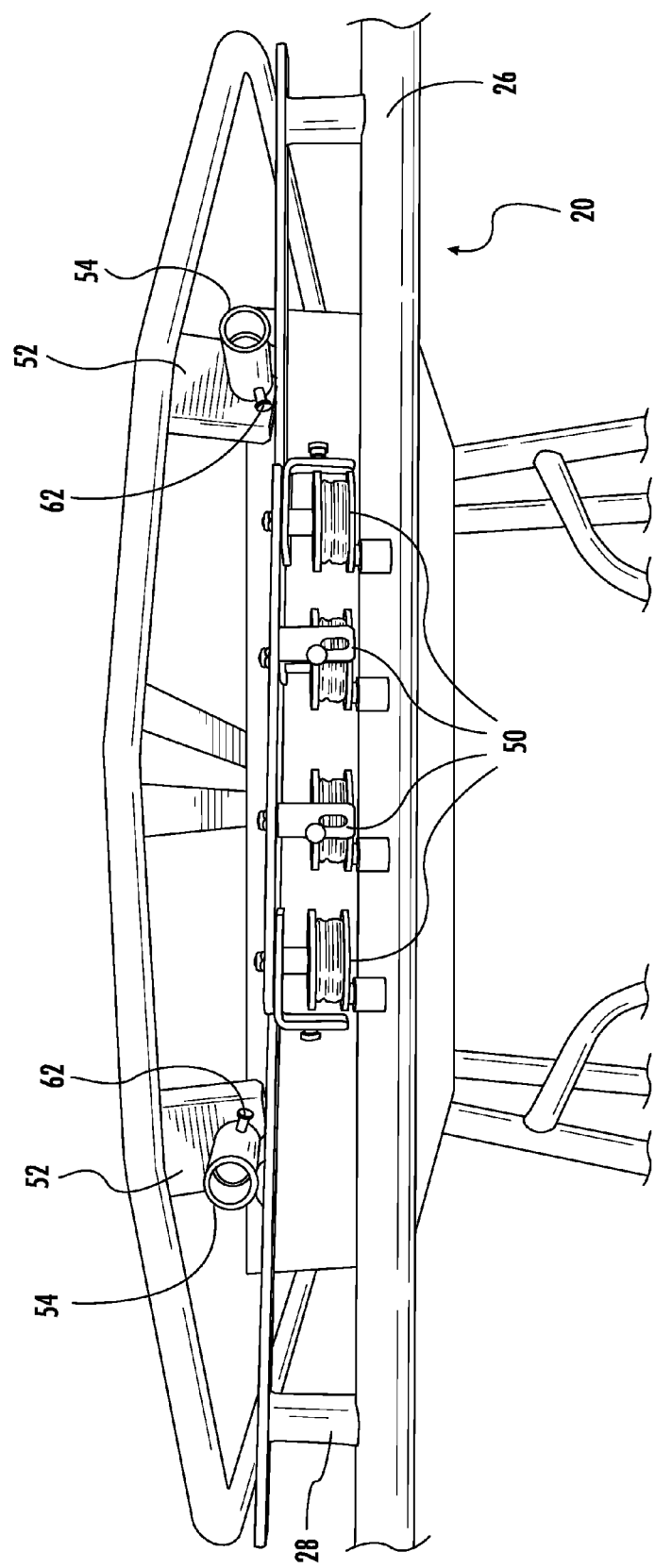
FIG. 5 is front view of one embodiment of an outrigger assembly illustrating one of several mounting configurations.

With reference to FIG. 5, a front view of one embodiment of an outrigger assembly is shown illustrating a mounting arrangement. In this arrangement a mounting element or bracket 52 and a coupling element 54, are provided and are constructed and arranged for secure nesting engagement there between. A locking pin 62 is configured to secure the mounting element 52 to the coupling element 54.

Figure 6:
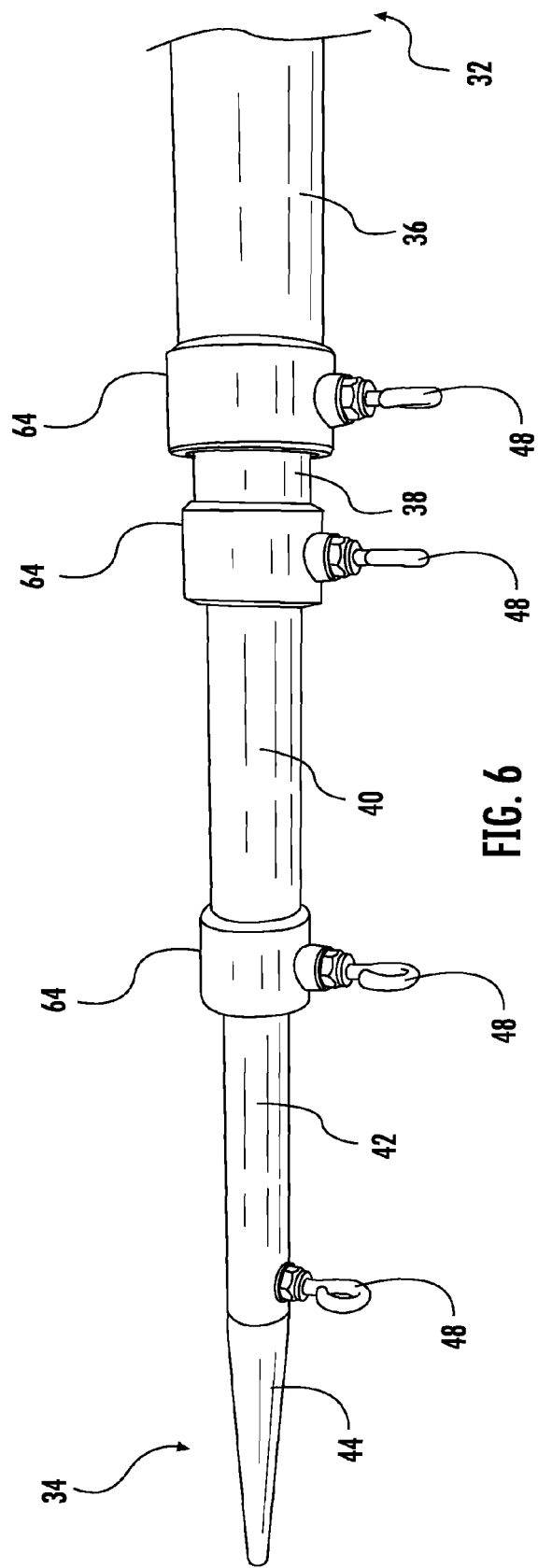
FIG. 6 is a front view of a telescopic pole embodiment in a substantially retracted position.

Now referring to FIG. 6, a front view of a telescopic pole embodiment in a retracted position is shown. Pointed end 44 is inserted into the most distal tubular section 42, which is secured thereto by interaction with eyelet 48. Adjacent sections 42, 40, 38 and 36 are illustrated as including guiding flanges 64 to which the eyebolts 48 are secured. Proximal end 32 is shown to be positioned within containment assembly 26.

Figure 7:
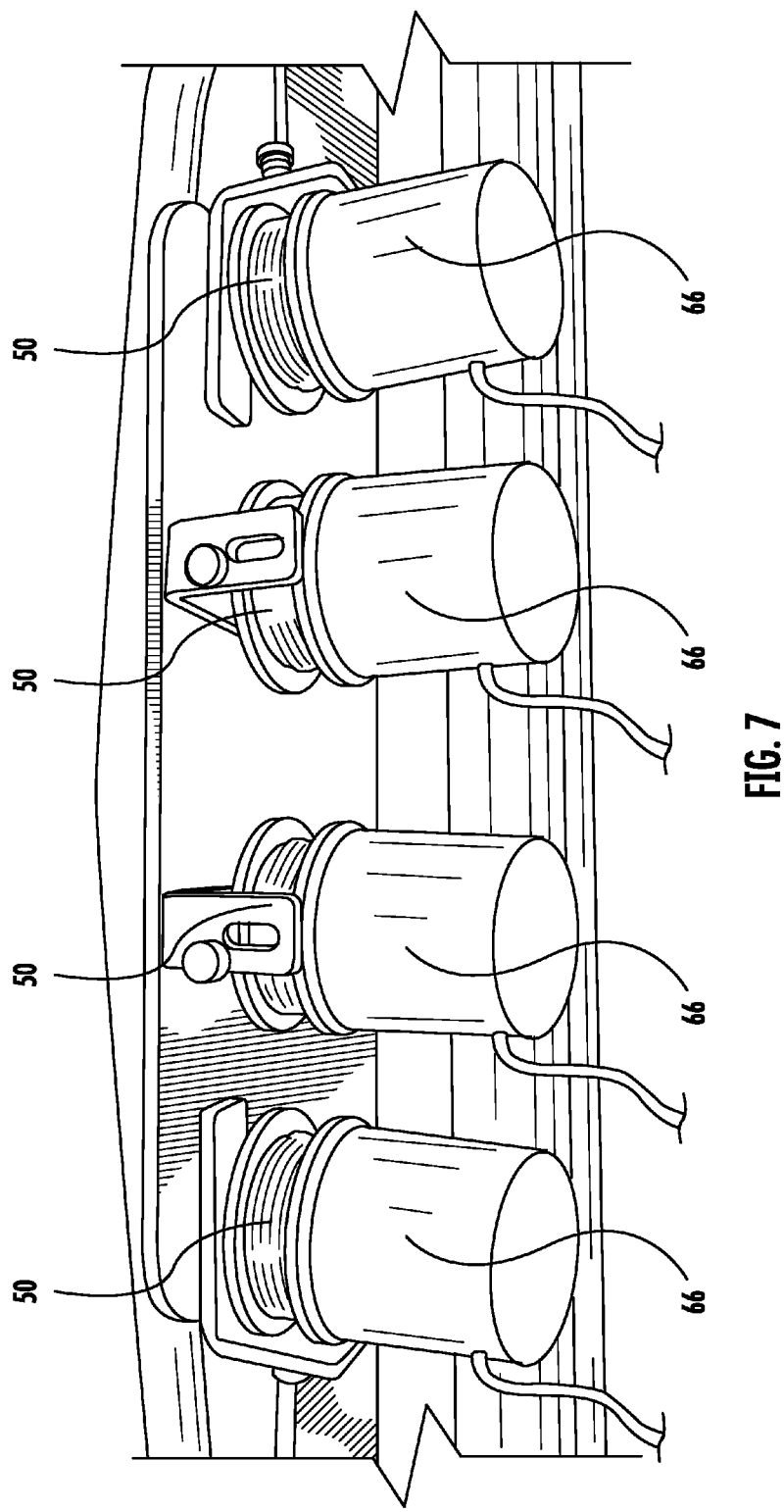
FIG. 7 is a perspective view of an embodiment of an outrigger assembly including electric reels.

Referring now to FIG. 7, an embodiment is illustrated wherein the plurality of reels 50 are electrically operated, by virtue of electric motors 66, which are in mechanical engagement with reels 50.

Figure 8:
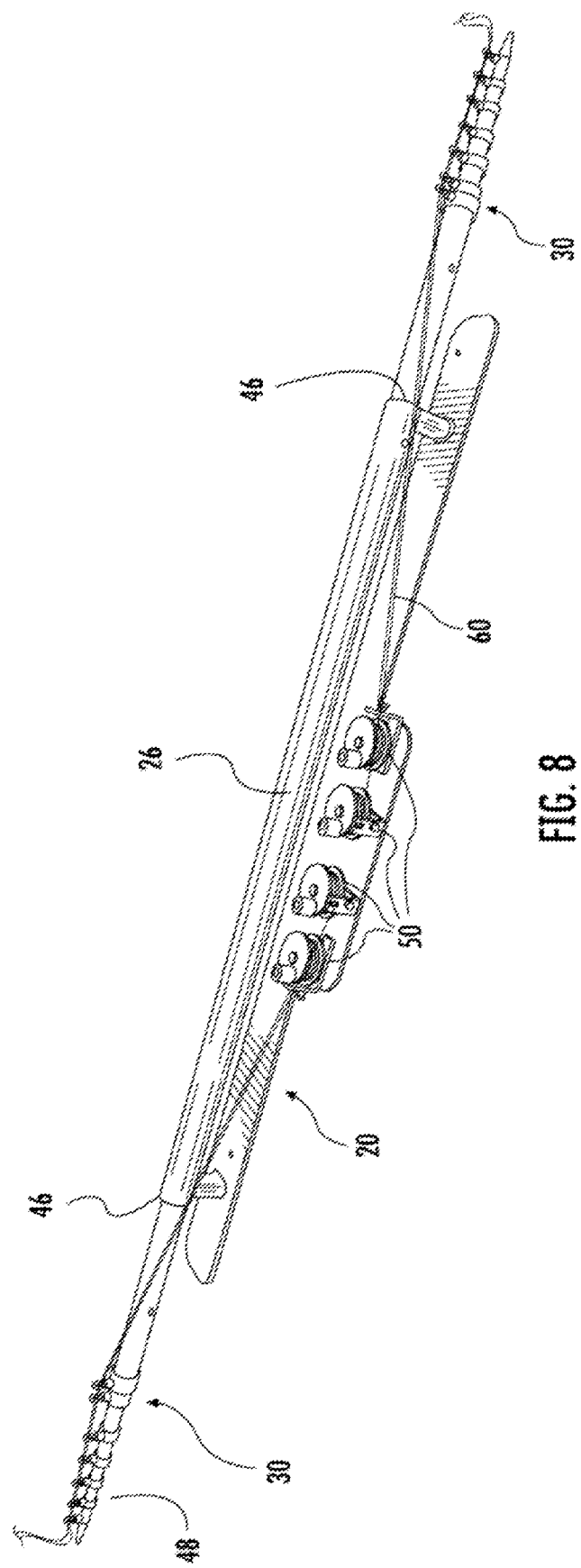
FIG. 8 is a perspective view of an alternative embodiment of an outrigger assembly in a substantially retracted configuration.

With reference to FIG. 8, a perspective view of another embodiment of an outrigger assembly in a substantially retracted configuration is shown. In this embodiment the containment assembly 26 is illustrated as being formed of a single tubular element. Each telescoping outrigger pole 30 is inserted into a side opening 46, of said containment assembly 26 whereby the outrigger poles are positioned for horizontally opposed extension from their retracted position. In this embodiment, each of the outrigger poles 30 are coaxial with the containment assembly 26 and with one another. In this figure fishing line 60 is illustrated traversing through guide elements 48.

Figure 9:
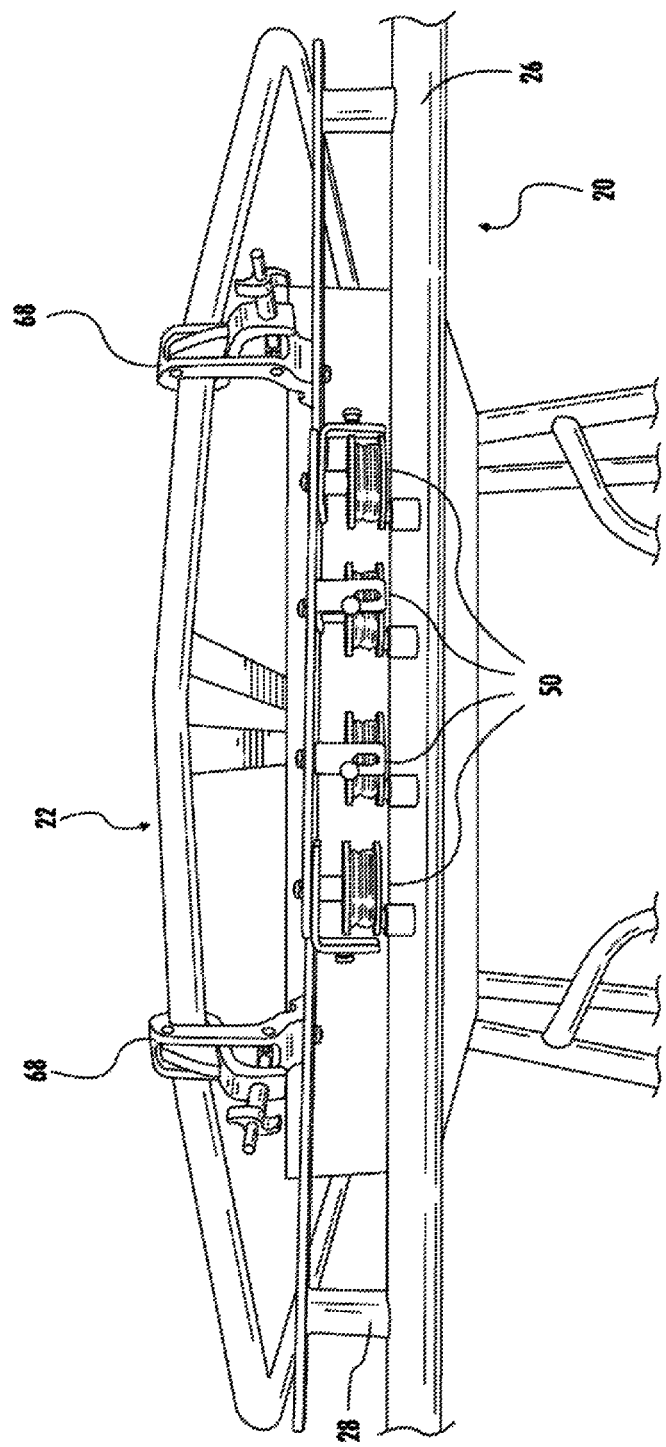
FIG. 9 is a front view of an embodiment of an outrigger assembly illustrating an alternative mounting design.

Referring now to FIG. 9, an alternative mounting design for the outrigger assembly is illustrated. In this embodiment, as compared to the embodiment illustrated in FIG. 5, the means for fastening of the outrigger assembly 20 to the T-top 22 include at least one clamp 68 adapted for mechanical engagement with said base plate 24, and further adapted to be removably engageable with said T-top 22. It is understood that T-Tops for boats are supplied in a variety of configurations, e.g. as hard T-Tops, generally formed from fiberglass or the like material of construction, and as soft T-Tops, such as those formed from a combination of a material, e.g. canvas or the like, mounted upon and strung to a tubular framework, e.g. aluminum or stainless steel tubing, or any acceptable modification thereof. The invention fully contemplates any mode of attachment useful with any particular T-Top, and may include, albeit is not limited to, mechanical fasteners such as screws, mounting plates and assorted hardware, clamping devices, and the like modes capable of achieving mounting of the outrigger assembly to the particular T-Top.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A sport fishing boat outrigger assembly for mounting to a T-top of a boat comprising:
   a base plate;
   a pair of telescoping outrigger poles, each of said outrigger poles having a proximal end and a distal end, each of said outrigger poles being formed from a plurality of elongated tubular sections of successively smaller cross-section, each of said outrigger poles being telescopingly joined and movable between a retracted position and an extended position, and each said tubular section has means affixed thereto for guiding fishing or teaser lines;
   a telescoping outrigger pole containment assembly fixedly engaged in horizontal alignment with said base plate, said telescoping outrigger pole containment assembly constructed and arranged to receive the proximal end of each said telescoping outrigger poles in a side opening thereof, thereby positioning said telescoping outrigger poles for horizontally opposed extension from their retracted position; and
   wherein each of said telescoping outrigger poles are stored within said telescoping outrigger pole containment assembly when retracted.

2. The outrigger assembly of claim 1 wherein said means for guiding fishing or teaser lines is an eyebolt.

3. The outrigger assembly of claim 1 further comprising a plurality of reels in mechanical engagement with said base plate, each said reels controlling a line adapted to traverse said means for guiding said fishing or teaser lines.

4. The outrigger assembly of claim 3 wherein said plurality of reels are electrically operated.

5. The outrigger assembly of claim 1 wherein said plurality of elongated tubular sections includes a means for locking one section to another.

6. The outrigger assembly of claim 5 wherein said means for locking include at least one locking button attached to one of said plurality of elongated tubular sections which is adapted to be receivably engaged within at least one aperture in an adjacent section.

7. The outrigger assembly of claim 1 further including means for fastening said outrigger assembly to said T-top of said boat.

8. The outrigger assembly of claim 7 wherein said means for fastening include at least one mounting element adapted for mechanical engagement with said T-top and at least one coupling element adapted for mechanical engagement with said base plate, wherein said mounting element and coupling element are constructed and arranged for secure nesting engagement there between.

9. The outrigger assembly of claim 7 wherein said means for fastening include at least one clamp adapted for mechanical engagement with said base plate, and further adapted to be removably engaged with said T-top.

10. The outrigger assembly of claim 1 wherein said telescoping outrigger pole containment assembly includes a first tubular element and a second tubular element, the longitudinal axes of which are parallel to one another and to said base plate.

11. The outrigger assembly of claim 1 wherein said telescoping outrigger pole containment assembly includes a single tubular element having a longitudinal axis parallel to said base plate.

12. The outrigger assembly of claim 1 wherein each said telescoping pole distal tubular section has an end cap affixed to its outermost end.

13. A sport fishing boat outrigger assembly for mounting to a T-top of a boat comprising:

a base plate;

a pair of telescoping outrigger poles, each of said outrigger poles having a proximal end and a distal end, each of said outrigger poles being formed from a plurality of elongated tubular sections of successively smaller cross-section, each of said outrigger poles being telescopingly joined and movable between a retracted position and an extended position, each said elongated tubular section having means affixed thereto for guiding fishing or teaser lines, said plurality of elongated tubular sections including means for locking one section to another;

a plurality of reels in mechanical engagement with said base plate, each of said reels controlling a line adapted to traverse said means for guiding said fishing or teaser lines;

a telescoping outrigger pole containment assembly fixedly engaged in horizontal alignment with said base plate, said telescoping outrigger pole containment assembly constructed and arranged to receive the proximal end of each said telescoping outrigger poles therein, whereby each of said telescoping outrigger poles are stored within said telescoping outrigger pole containment assembly, said telescoping outrigger pole containment assembly having a first tubular element and a second tubular element, each of said first tubular element and said second tubular element having longitudinal axes which are parallel to one another and to said base plate; and means for fastening said outrigger assembly to said T-top of said boat;

wherein each of said telescoping outrigger poles distal ends are thereby arranged to extend in horizontally opposed directions from one another.

14. The outrigger assembly of claim 13 wherein said means for guiding said fishing or teaser lines is an eyebolt.

15. The outrigger assembly of claim 13 wherein said plurality of reels are electrically operated.

16. The outrigger assembly of claim 13 wherein said means for locking include at least one locking button attached to one of said plurality of elongated tubular sections which is adapted to be receivably engaged within at least one aperture in an adjacent section.

17. The outrigger assembly of claim 13 wherein said means for fastening include at least one mounting element adapted for mechanical engagement with said T-top and at least one coupling element adapted for mechanical engagement with said base plate, wherein said mounting element and coupling element are constructed and arranged for secure nesting engagement there between.

18. The outrigger assembly of claim 13 wherein said means for fastening include at least one clamp adapted for mechanical engagement with said base plate, and further adapted to be removably engaged with said T-top.

19. The outrigger assembly of claim 13 wherein each said telescoping pole distal tubular section has an end cap affixed to its outermost end.

20. A sport fishing boat outrigger assembly for mounting to a T-top of a boat comprising:

a base plate;

a pair of telescoping outrigger poles, each of said outrigger poles having a proximal end and a distal end, each of said outrigger poles being formed from a plurality of elongated tubular sections of successively smaller cross-section, each of said outrigger poles being telescopingly joined and movable between a retracted position and an extended position, each said elongated tubular section having means affixed thereto for guiding fishing or teaser lines, said plurality of elongated tubular sections including means for locking one section to another;

a plurality of reels in mechanical engagement with said base plate, each of said reels controlling a line adapted to traverse said means for guiding said fishing or teaser lines;

a telescoping outrigger pole containment assembly fixedly engaged in horizontal alignment with said base plate, said telescoping outrigger pole containment assembly constructed and arranged to receive the proximal end of each said telescoping outrigger poles therein, whereby each of said telescoping outrigger poles are stored within said telescoping outrigger pole containment assembly, said telescoping outrigger pole containment assembly having a single tubular element with a longitudinal axis parallel to said base plate; and means for fastening said outrigger assembly to said T-top of said boat;

wherein each of said telescoping outrigger poles distal ends are thereby arranged to extend in horizontally opposed directions from one another.

21. The outrigger assembly of claim 20 wherein said means for guiding said fishing or teaser lines is an eyebolt.

22. The outrigger assembly of claim 20 wherein said plurality of reels are electrically operated.

23. The outrigger assembly of claim 20 wherein said means for locking include at least one locking button attached to one of said plurality of elongated tubular sections which is adapted to be receivably engaged within at least one aperture in an adjacent section.

24. The outrigger assembly of claim 20 wherein said means for fastening include at least one mounting element adapted for mechanical engagement with said T-top and at least one coupling element adapted for mechanical engagement with said base plate, wherein said mounting element and coupling element are constructed and arranged for secure nesting engagement there between.

25. The outrigger assembly of claim 20 wherein said means for fastening include at least one clamp adapted for mechanical engagement with said base plate, and further adapted to be removably engaged with said T-top.

26. The outrigger assembly of claim 20 wherein each said telescoping pole distal tubular section has an end cap affixed to its outermost end.

* * * * *